United States Patent
Wheeler et al.

(10) Patent No.: US 7,904,268 B2
(45) Date of Patent: Mar. 8, 2011

(54) DIAGNOSTIC APPARATUS AND METHODS FOR A CORIOLIS FLOW METER

(75) Inventors: Matthew Glen Wheeler, White Salmon, WA (US); David F. Normen, Louisville, CO (US); Mark James Bell, Arvada, CO (US); Matthew T. Crisfield, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 10/575,983

(22) PCT Filed: Oct. 22, 2003

(86) PCT No.: PCT/US03/33531
§ 371 (c)(1),
(2), (4) Date: Apr. 17, 2006

(87) PCT Pub. No.: WO2005/050145
PCT Pub. Date: Jun. 2, 2005

(65) Prior Publication Data
US 2007/0017274 A1    Jan. 25, 2007

(51) Int. Cl.
*G01F 1/12* (2006.01)
*G01F 1/50* (2006.01)
*G01F 25/00* (2006.01)

(52) U.S. Cl. ..................................... 702/100
(58) Field of Classification Search ............. 702/85, 702/100, 104, 105, 45, 50, 56; 73/1.16, 861, 73/861.18, 570
See application file for complete search history.

(56) References Cited

U.S. PATENT DOCUMENTS

| RE31,450 E | 11/1983 | Smith |
| 5,576,500 A * | 11/1996 | Cage et al. ............... 73/861.357 |
| 5,594,180 A | 1/1997 | Carpenter et al. |
| 6,092,409 A | 7/2000 | Patten et al. |
| 6,678,624 B2 * | 1/2004 | Normen ................... 702/100 |
| 7,716,995 B2 * | 5/2010 | Patten et al. ............. 73/861.355 |
| 2003/0037619 A1 * | 2/2003 | Hage ....................... 73/778 |

(Continued)

FOREIGN PATENT DOCUMENTS

EP    0816807 A2    1/1998

(Continued)

OTHER PUBLICATIONS

Answers.com, "Damping", printed Jan. 5, 2009.*

(Continued)

*Primary Examiner* — Michael P Nghiem
(74) *Attorney, Agent, or Firm* — The Ollila Law Group LLC (57) ABSTRACT

A method for validating a flow calibration factor of a flow meter is provided according to an embodiment of the invention. The method for validating a flow calibration factor of a flow meter includes determining an initial flexural stiffness of a component of the flow meter. The method for validating a flow calibration factor of a flow meter includes determining a current flexural stiffness of the component. The method for validating a flow calibration factor of a flow meter further includes comparing the initial flexural stiffness to the current flexural stiffness. The method for validating a flow calibration factor of a flow meter further includes detecting a calibration error condition responsive to comparing the initial flexural stiffness to the current flexural stiffness.

33 Claims, 7 Drawing Sheets

U.S. PATENT DOCUMENTS

| | | | |
|---|---|---|---|
| 2003/0055580 A1* | 3/2003 | Normen | 702/45 |
| 2003/0191598 A1* | 10/2003 | Normen | 702/100 |
| 2006/0207346 A1* | 9/2006 | Van Cleve | 73/861.355 |
| 2006/0265148 A1* | 11/2006 | Stack et al. | 702/45 |
| 2008/0184813 A1* | 8/2008 | Patten et al. | 73/861.355 |

FOREIGN PATENT DOCUMENTS

| | | |
|---|---|---|
| RU | 2164009 C2 | 3/2001 |
| WO | WO96/05484 A1 | 2/1996 |
| WO | WO-9939164 A1 | 5/1999 |
| WO | WO-9939164 | 8/1999 |
| WO | WO03/021205 A | 3/2003 |
| WO | WO-03021205 A1 | 3/2003 |

OTHER PUBLICATIONS

Alfred Rieder, Modellgestutzte Auslegung und Realisierung eines Coriolis-Massendurchflussmessers mit einem geraden MeBrohr, Mess-, Steuerungs- und Regelungstecchnik, vol. 8, No. 371, 1998, pp. 66-79.

* cited by examiner

DIAGNOSTIC APPARATUS AND METHODS FOR A CORIOLIS FLOW METER

BACKGROUND OF THE INVENTION

1. Field of the Invention

The present invention relates to diagnostic apparatus and methods for a Coriolis flow meter.

2. Statement of the Problem

It is known to use Coriolis mass flow meters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flow meters have one or more flow tubes of different configurations. Each conduit configuration may be viewed as having a set of natural vibration modes including, for example, simple bending, torsional, radial and coupled modes. In a typical Coriolis mass flow measurement application, a conduit configuration is excited in one or more vibration modes as a material flows through the conduit, and motion of the conduit is measured at points spaced along the conduit.

The vibrational modes of the material filled systems are defined in part by the combined mass of the flow tubes and the material within the flow tubes. Material flows into the flow meter from a connected pipeline on the inlet side of the flow meter. The material is then directed through the flow tube or flow tubes and exits the flow meter to a pipeline connected on the outlet side.

A driver applies a force to the flow tube. The force causes the flow tube to oscillate. When there is no material flowing through the flow meter, all points along a flow tube oscillate with an identical phase. As a material begins to flow through the flow tube, Coriolis forces cause each point along the flow tube to have a different phase with respect to other points along the flow tube. The phase on the inlet side of the flow tube lags the driver, while the phase on the outlet side leads the driver. Sensors are placed at different points on the flow tube to produce sinusoidal signals representative of the motion of the flow tube at the different points. A phase difference of the signals received from the sensors is calculated in units of time.

The phase difference between the sensor signals is proportional to the mass flow rate of the material flowing through the flow tube or flow tubes. The mass flow rate of the material is determined by multiplying the phase difference by a flow calibration factor. Prior to installation of the flow meter into a pipeline, the flow calibration factor is determined by a calibration process. In the calibration process, a known fluid is passed through the flow tube at a given flow rate and the proportion between the phase difference and the flow rate is calculated.

One advantage of a Coriolis flow meter is that there are no moving components in the vibrating flow tube. The flow rate is determined by multiplying the phase difference between two points on the flow tube and the flow calibration factor. The phase difference is calculated from sinusoidal signals received from the sensors indicating the oscillation of two points on the flow tube. The flow calibration factor is proportional to the material and cross sectional properties of the flow tube. Therefore, the measurement of the phase difference and the flow calibration factor are not affected by wear of moving components in the flow tube.

However, it is a problem that material properties, cross sectional properties and the stiffness of a flow tube can change during use of the Coriolis flow meter. The changes in the material properties, cross sectional properties and stiffness of the flow tube are caused by erosion, corrosion, and coating of the flow tube by material flowing through the flow tube, changing pipeline mountings and temperature. One example of the change in cross-sectional properties of the flow tube is the change in the moment of inertia caused by corrosion of the flow tube. A second example of a change in the material and cross-sectional properties of the flow tube is an increase of the mass of the flow tube and a decrease in cross-sectional areas caused by coating of the flow tube by materials flowing through the tube. A change in the material properties, cross sectional properties and stiffness of the flow tube can change the flow calibration factor of the flow meter. If the flow calibration factor of the flow meter changes, flow rates that are calculated using the original flow calibration factor are inaccurate. Therefore, there is a need in the art for a system that detects a possible change in the material properties, cross sectional properties and/or stiffness of a flow tube indicating that the mass flow rates measured by the Coriolis flow meter may be inaccurate.

SUMMARY OF THE SOLUTION

The above and other problems are solved and an advance in the art is achieved through the provision of a system for validating the flow calibration factor of a Coriolis flow meter through the determination of flexural stiffness and other parameters. The described validation system can be used to solve either single degree of freedom models or multiple degrees of freedom models.

Some examples of the validation system capable of solving single degree of freedom models include measuring the tube stiffness with an auxiliary displacement sensor. The auxiliary displacement sensor is placed on a flow tube of the flow meter. A known force is applied to the flow tube and the resulting deflection is measured by the auxiliary displacement sensor. The resulting tube stiffness can be use to predict changes in the sensor calibration factor.

Some examples of the validation system capable of solving single degree of freedom models include estimating tube stiffness from a drive loop frequency response. The drive loop response function contains a stiffness term which can be correlated to the flexural stiffness of the flow tube. The resulting flexural stiffness can be used to predict changes in the sensor calibration factor.

Some examples of the validation system capable of solving multiple degree of freedom models include estimating tube stiffness from model parameters. A response model representing the flow meter is converted to a modal model. The modal model is than converted to a physical model. The physical model contains parameters of interest including tube stiffness and damping that can be used to determine a change in the calibration factor.

In some examples, the data acquired must be normalized. Normalization is needed to cancel out changes in the properties of the system that change with time. Correcting resonant frequency due to changes in tube temperature is one example of the need for normalization.

Some examples of the validation system include methods and appartus for correction of the flow calibration factor using linear or non-linear equations, trending or multi-fluid calibration.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Example 1

Factors that affect flexural stiffness also affect Coriolis flow meter sensitivity (flow calibration factor). Flexural stiffness is the static spring rate derived from flexing the flow tube with a known force pattern and measuring the flow tube displacement. Any force pattern could be used to measure flexural stiffness, as long as it is invariant. As an example, the flexural stiffness for a clamped beam is as follows:

$$K_{Flex} = \frac{F}{\delta} = \frac{192EI}{L^3} \quad (1)$$

where:
F—Force (N);
E—Young's Modulus (N/m$^2$);
I—Moment of Inertia (m$^4$);
L—Length (m);
K$_{flex}$—flexural stiffness of flow tube.

For a Coriolis flow meter, if flexural stiffness changes, then so must calibration factor. Flexural stiffness of a Coriolis flow meter is defined as:

$$K_{flex} = C_P C_G C_S [EI] \quad (2)$$

where:
C$_P$—effect of force pattern on flexural stiffness;
C$_G$—effect of unflexed tube bend geometry on flexural stiffness;
C$_S$—effect of unflexed tube stress on flexural stiffness.

For a straight tube Coriolis flow meter with no pre-stress the following expressions show the dependence of calibration factor on EI:

$$m = C\left[\frac{EI}{L^3}\right]\Delta T \quad (3)$$

So the flow calibration factor (FCF) for the straight tube is:

$$FCF = C\left[\frac{EI}{L^3}\right] \quad (4)$$

where C is a constant determined by mode shape and pick-off locations.

Figure 1:
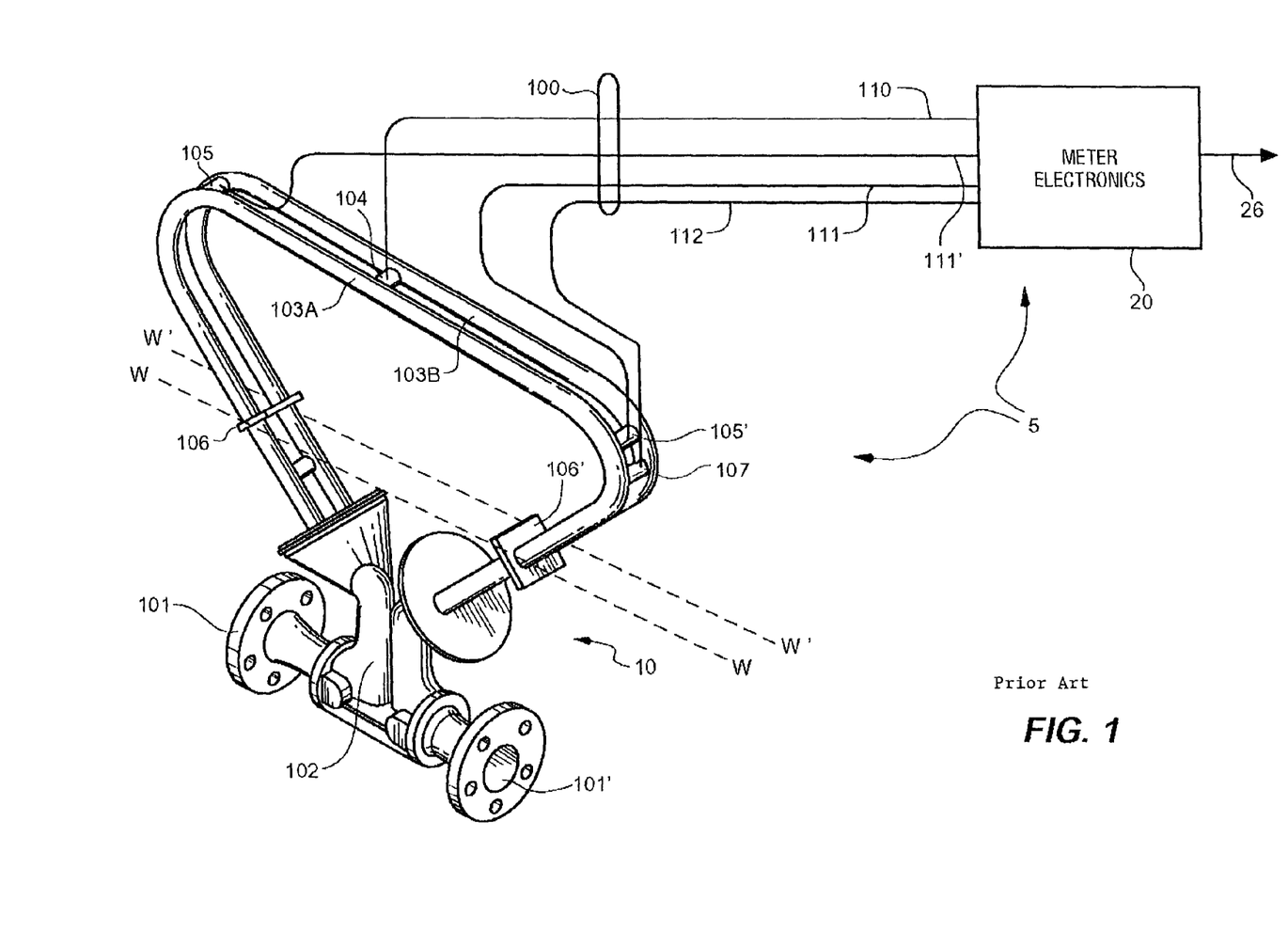
FIG. 1 illustrates a Coriolis flow meter in an example of the invention.

FIG. 1 illustrates a Coriolis flow meter 5 capable of directly estimating flexural stiffness by applying a known force to the flow tubes and measuring the resulting deflection. Coriolis flow meter 5 comprising a flow meter assembly 10 and meter electronics 20. Meter electronics 20 is connected to meter assembly 10 via leads 100 to provide density, mass flow rate, volume flow rate, totalized mass flow and other information over path 26.

Flow meter assembly 10 includes a pair of flanges 101 and 101', manifold 102 and flow tubes 103A and 103B. Connected to flow tubes 103A and 103B are driver 104, pick-off sensors 105 and 105' and auxiliary position sensor 107. Brace bars 106 and 106' serve to define the axes W and W' about which each flow tube 103A and 103B oscillates.

When flow meter assembly 10 is inserted into a pipeline system (not shown) which carries the material being measured, material enters flow meter assembly 10 through flange 101, passes through manifold 102 where the material is directed to enter flow tubes 103A and 103B, flows through flow tubes 103A and 103B and back into manifold 102 where it exits meter assembly 10 through flange 101'.

Flow tubes 103A and 103B are selected and appropriately mounted to manifold 102 so as to have substantially the same mass distribution, moment of inertia, and elastic modulus about bending axes W-W and W'-W' respectively. The flow tubes extend outwardly from the manifold in an essentially parallel fashion.

Flow tubes 103A-B are driven by driver 104 in opposite directions about their respective bending axes W and W' and at what is termed the first out of phase bending mode of the flow meter. Driver 104 may comprise one of many well known arrangements, such as a magnet mounted to flow tube 103A and an opposing coil mounted to flow tube 103B. An alternating current is passed through the opposing coil to cause both tubes to oscillate. A suitable drive signal is applied by meter electronics 20, via lead 110 to driver 104. The force pattern generated by driver 104 is fixed over the life of the sensor (i.e. C$_P$ is constant). Driver 104 generates a constant force and auxiliary position sensor 107 determines the tube displacement. As shown in FIG. 1, the auxiliary sensor would be positioned near the pick-offs 105 or 105' however other suitable locations could be utilized.

Meter electronics 20 receives the right and left velocity signals appearing on leads 111 and 111', respectively and the tube displacement over lead 112. Meter electronics 20 produces the drive signal on lead 110 which causes driver 104 to oscillate flow tubes 103A and 103B. The present invention as described herein can produce multiple drive signals from multiple drivers. Meter electronics 20 processes left and right velocity signals and a tube displacement signal to compute mass flow rate and provide the validation system of the present invention. Path 26 provides an input and an output means that allows meter electronics 20 to interface with an operator.

Figure 2:
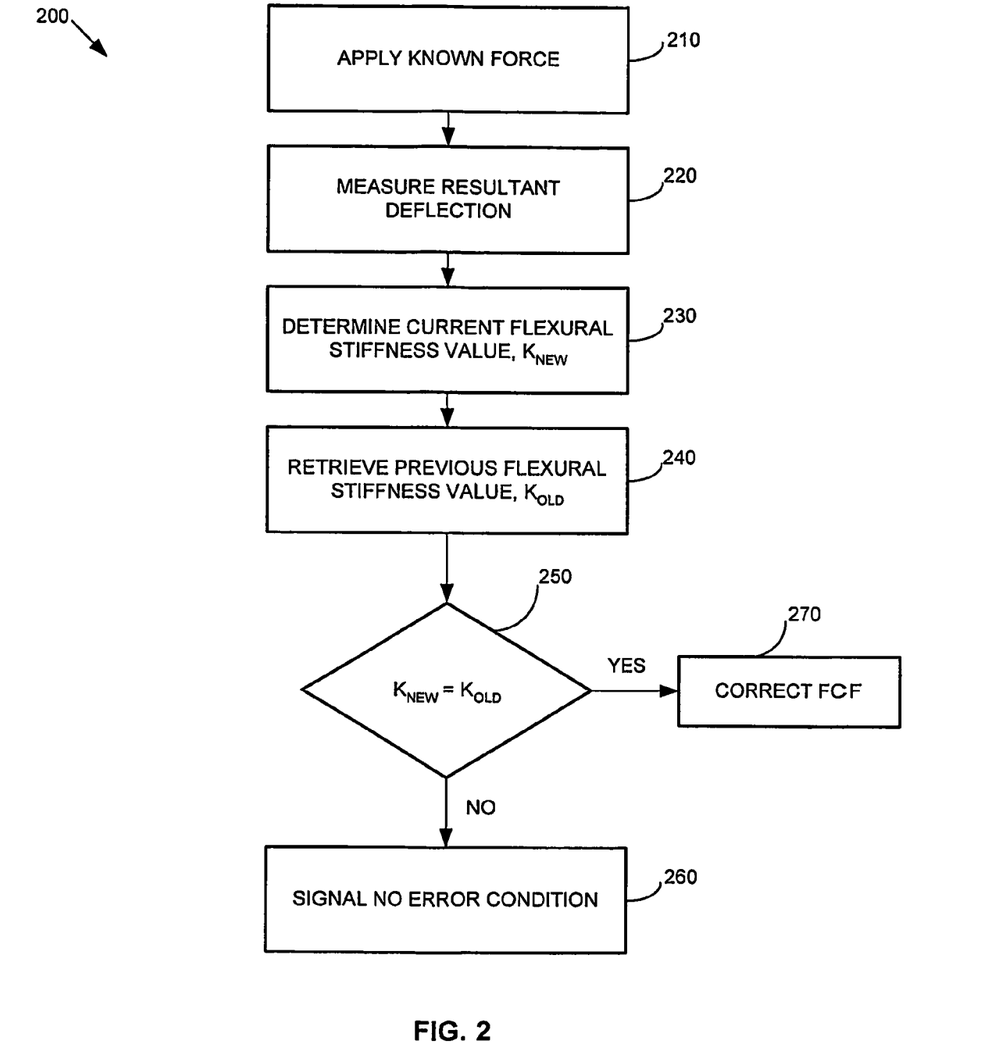
FIG. 2 illustrates a validation system in an example of the invention.

FIG. 2 shows a process 200 for validating the flow calibration factor of Coriolis flow meter 5 using calculated changes in its flexural stiffness. Process 200 begins in step 210 by applying a known force to flow tubes 103 A&B using driver 104. In step 220, auxiliary position sensor 107 determines the tube displacement resulting from the force applied by driver 104. The flexural stiffness, $K_{new}$, is measured in step 230 using the force and tube displacement from steps 210 and 220. A previous flexural stiffness, $K_{old}$, is retrieved in step 240. This previous flexural stiffness is determined either at the factory or after the meter is installed. Step 250 compares $K_{new}$ with $K_{old}$ to determine if there has been a change in the flexural stiffness of the meter. If no change has been detected, step 260 signals a "no error" condition and repeats the process. If a change has been detected, step 270 corrects the flow calibration factor (FCF) based on the stiffness change.

Example 2

Flow tube flexural stiffness can also be determined by estimating points on a tube frequency response function (FRF) at given frequencies. These points are then used to fit a single degree of freedom model to the data and finally determine the DC (e.g. zero crossing) point on the FRF.

It is possible to write a general expression for any cross (not collocated) mobility frequency response function as a linear combination of SDOF responses:

$$\frac{v}{f} = H(s) = \sum_{i=1}^{N} \frac{s}{m_i s^2 + c_i s + k_i} \quad (5)$$

or equivalently modeled by:

$$\frac{v}{f} = H(s) = \sum_{i=1}^{N} \frac{A_i s}{s^2 + 2\zeta_i \omega_i s + \omega_i^2} \quad (6)$$

where v is the pickoff velocity, f is the driver force and H(s) is the FRF of interest. The drive loop frequency response can be approximated well in this manner. In fact, at frequencies near the drive frequency, only one term in the summation is required for good approximation of the frequency response. If more accuracy is required in parameter estimation, then more than one mode can be retained in the model.

As an alternative to including more modes, the higher frequency modes could be masked from the drive loop frequency response by selecting the location of the driver and pickoff coils. The second bend mode (twist mode) can be masked from the drive loop frequency response because the driver is located on the node of the second mode. If the pick-off's were located on the nodes of the third mode, then the third mode is masked from the drive loop frequency response as well. With this driver/pickoff pattern, the drive loop frequency response is very close to a SDOF system.

Modeling the drive loop as an SDOF system results in the following:

$$\frac{v}{f} = H(s) = \frac{s}{m_1 s^2 + c_1 s + k_1} \quad (7)$$

or equivalently modeled by:

$$\frac{v}{f} = H(s) = \frac{A_1 s}{s^2 + 2\zeta_1 \omega_1 s + \omega_1^2} \quad (8)$$

The drive loop frequency response can be converted from mobility (velocity) to receptance (displacement) by integrating (multiplying by 1/s):

$$\frac{x}{f} = \frac{H(s)}{s} = \frac{1}{m_1 s^2 + c_1 s + k_1} \quad (9)$$

again equivalently modeled by:

$$\frac{x}{F} = \frac{H(s)}{s} = \frac{A_1}{s^2 + 2\zeta_1 \omega_1 s + \omega_1^2} \quad (10)$$

The stiffness term $k_1$ is well correlated with flexural stiffness, and thus is a good predictor of changes in flow cal factor caused by changes in flexural stiffness.

Figure 3:
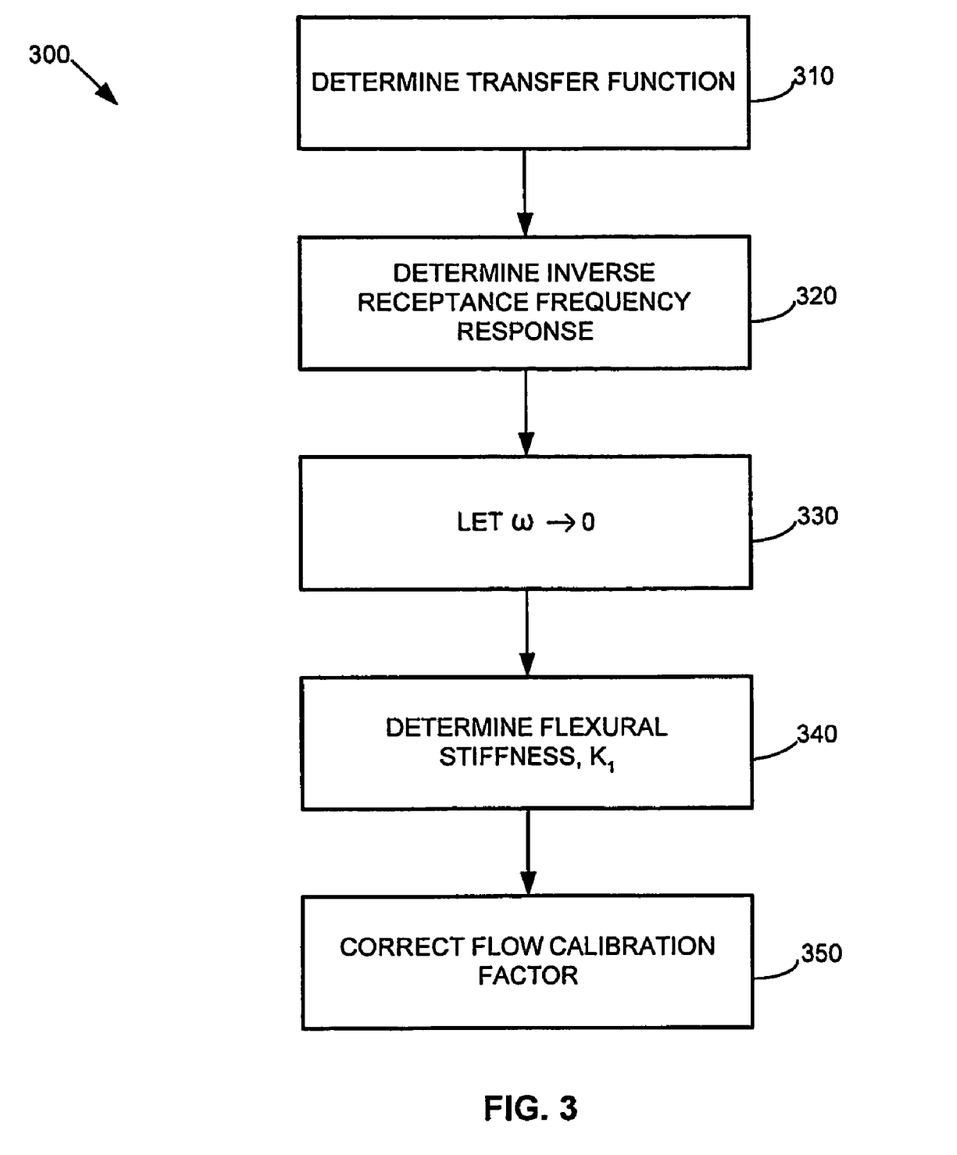
FIG. 3 illustrates a validation system in an example of the invention.

To estimate the stiffness parameter $k_1$ a single or multiple frequency estimation can be used. FIG. 3 shows a process 300 for validating a flow calibration factor using single frequency estimation. Single frequency estimation 300 begins in step 310 by determining a receptance transfer function (9). In step 320, the inverse of the receptance transfer function at $i\omega$ is determined to get the inverse receptance frequency response:

$$\frac{i\omega}{H(i\omega)} = \frac{m_1(i\omega)^2 + c_1(i\omega) + k_1}{1} = m_1(i\omega)^2 + c_1 i\omega + k_1 \quad (11)$$

Next in step 330, we let $\omega \to 0$:

$$\lim_{\omega \to 0} \frac{i\omega}{H(i\omega)} = \lim_{\omega \to 0} m_1(i\omega)^2 + \lim_{\omega \to 0} c_1 i\omega + \lim_{\omega \to 0} k_1 \quad (12)$$

$$\lim_{\omega \to 0} \frac{i\omega}{H(i\omega)} = \lim_{\omega \to 0} k_1 = k_1 \quad (13)$$

So for $\omega \to 0$:

$$k_1 \simeq \frac{i\omega}{H(i\omega)} \quad (14)$$

If $m_1$ is known or is negligible, then a larger frequency closer to $\omega_1$ can be used to estimate $k_1$ from:

$$k_1 \simeq \frac{i\omega}{H(i\omega)} - c_1 i\omega \quad (15)$$

If $c_1$ and $m_1$ are both known, then any frequency can be used to estimate $k_1$ from:

$$k_1 \simeq \frac{i\omega}{H(i\omega)} m_1(i\omega)^2 - c_1 i\omega \quad (16)$$

In step 340 we calculate $k_1$ from expressions (14), (15), or (16) with ω in radians/second and correct the flow calibration factor based on the calculated $k_1$ in step 350.

Figure 4:
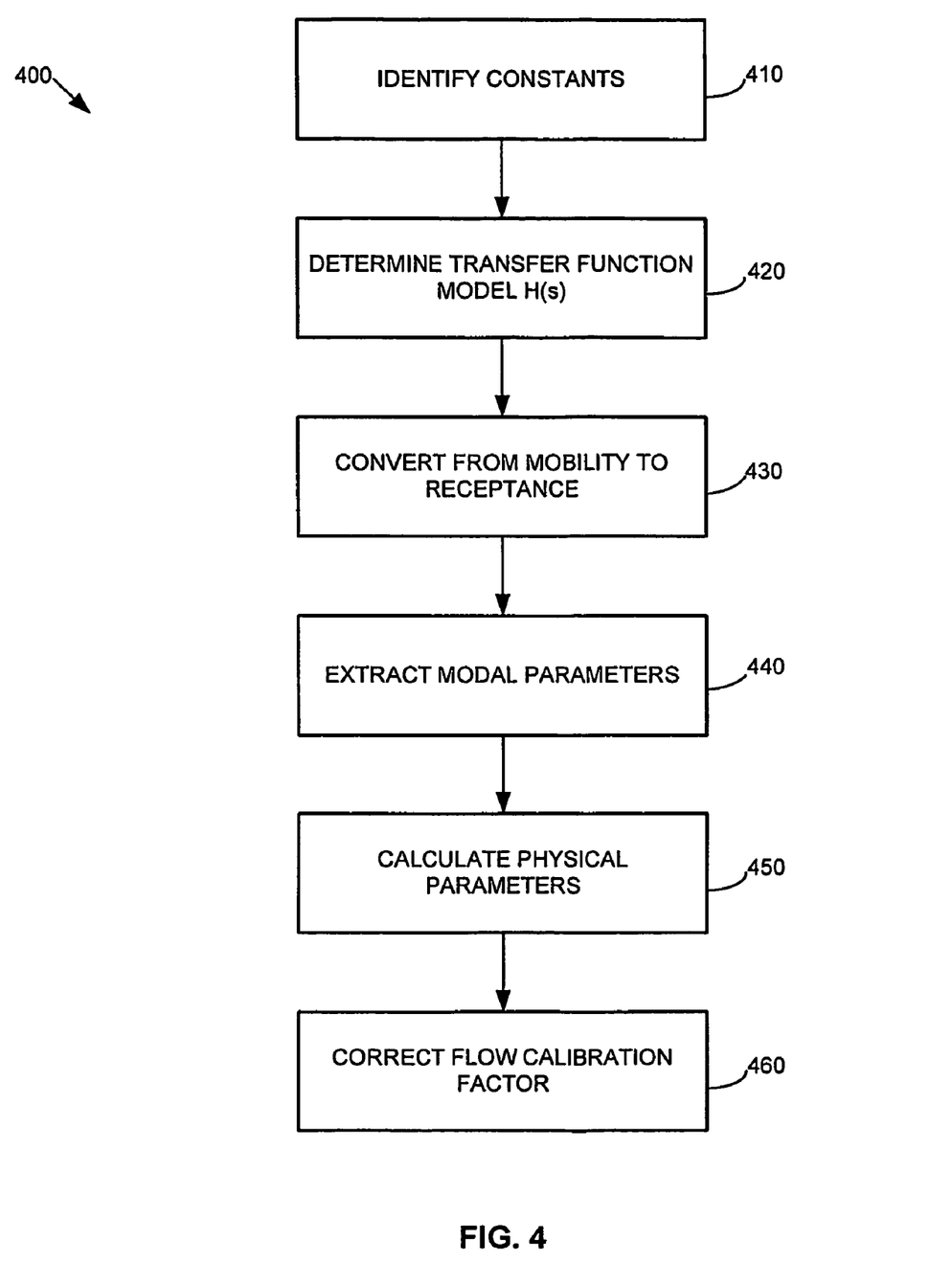
FIG. 4 illustrates a validation system in an example of the invention.

FIG. 4 shows a process 400 for validating a flow calibration factor using multiple frequency estimation. Multiple frequency estimation 400 begins in step 410 by identifying constants $m_1$, $c_1$, $k_1$, $\zeta_1$, $\omega_1$, $A_1$ using any time domain or frequency domain system identification method. In step 420, a curve fitting procedure is used to fit a rational continuous time transfer function model to the complex frequency response vector H at the set of frequencies in vector W (in radians/second). The number and location (in frequency) of the FRF data points does affect the quality of the fit. A good fit is achieved using as few as 2 frequency response data points. The derived model is of the form:

$$H(s) = \frac{b(1)s^{N_b} + b(2)s^{(N_b-1)} + \cdots + b(N_b + 1)}{s^{N_b} + a(2)s^{(N_a-1)} + \cdots + a(N_a + 1)} \quad (17)$$

The above model is incompatible with the mobility (velocity) form of the drive loop frequency response, because there is no way to force $b(N_b+1)=0$. In step 430, we get around this limitation by converting the driver pickoff mobility (velocity) frequency response data to the receptance (displacement) form. The measured mobility frequency response data H must be multiplied by $1/(i\omega)$. The measured mobility drive loop frequency response H should be from drive coil current (proportional to force) to pickoff voltage (proportional to velocity).

Converting the mobility data to receptance data yields H(s) in the form:

$$H(s) = \frac{b(1)}{a(1)s^2 + a(2)s + a(3)} \quad (18)$$

where $a(1)=1$. In step 440, the modal parameters of interest are extracted from the transfer function model as follows:

$$A_1 = b(1) \quad (19)$$
$$\omega_1 = \sqrt{a(3)}$$
$$\zeta_1 = a(2)/2/\omega_1$$

The physical parameters can then be calculated in step 450 using the following equations:

$$m_1 = 1/A_1$$
$$c_1 = 2\zeta_1\omega_1/A_1 \quad (20)$$
$$k_1 = \omega_1^2/A_1$$

Once the physical parameters are determined, changes in the flow calibration factor as well as other parameters, including changes in the mass and length of the flow tube, are determined and corrected in step 460. In addition to correction, warnings and meter shut down can be initiated based on the predetermined criteria.

Frequency Response Function Determination Using Multi-Sine Excitation

Accurately estimating points on the FRF can be difficult in real-time. Windowing and spectral line estimation often have estimation bias which has a direct impact on the ability to predict FCF changes. In order to more efficiently determine estimating points on the FRF and eliminate the need for windowing, a multi-sine input is used.

The multi-sine input method applies an efficient spectral line estimation routine using a minimum crest factor multi-sine input excitation signal. The minimum crest factor signal is used to minimize peak drive power and to limit large output signals. Large output signals often have non-linear components that cause measurement errors.

Figure 5:
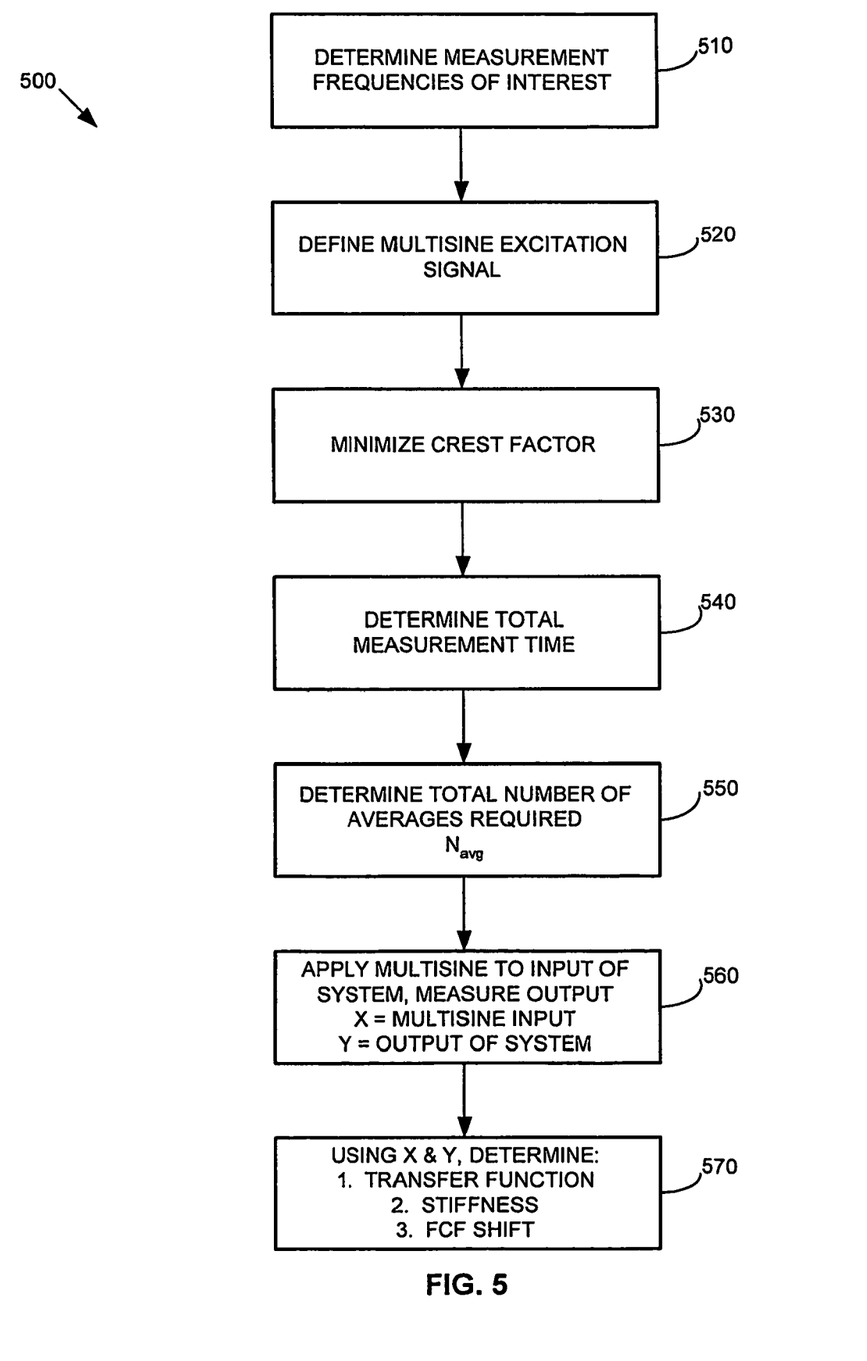
FIG. 5 illustrates a validation system in an example of the invention.

FIG. 5 shows a process 500 for calculating spectral lines used in validating a flow calibration factor using multiple frequency estimation. Process 500 begins with step 510 by determining measurement frequencies of interest. The frequencies of interest are determined from the following:

$$f_{j+1} = f_j + \Delta f (j=1:N_{sin}) \quad (21)$$

Next, a multi-sine excitation signal is defined in step 520 as:

$$x = \sum_{i=0}^{N-1} \sum_{j=0}^{N_{sin}-1} \sin(2\pi f_j t_i + \phi_j) \quad (22)$$

where,
$f_j$=frequencies for multi-sine
$\phi_j$=phase angle for multi-sine where $-\pi<\phi i<\pi$
$t_i$=discrete time point
N=number of data points in multi-sine
$N_{sin}$=number of sine waves in multi-sine
In order to maximize the input energy while minimizing the peak value, a Crest Factor (CF) is minimized with respect to $\phi_j$ in step 530. Crest Factor (CF) is defined as max/rms, $$CF(x) = \frac{\max(x(i))}{\sqrt{\sum_{i=0}^{N-1} x(i)^2 / N}} \quad (23)$$

In order to make efficient use of the multi-sine, total measurement time, step 540, and total number of averages, step 550, must be determined. The total measurement time can be calculated using the following equation:

$$tp = 1/\Delta f \quad (24)$$

Equation (24) yields a measurement time equal to the period of the multi-sine, resulting in a measurement that is minimally affected by parameter changes. The total number of averages required is normally chosen so as to reduce the standard deviation of the estimate due to noise. The signal-to-noise ratio and its direct relationship to the estimated confidence interval, normally determine the total number of averages necessary for a required accuracy.

Step 560 applies the multi-sine, x, to the input of the system and measures the resulting output, y. Step 570 uses x and y to determine the transfer function, stiffness and calibration factor using the techniques described herein.

Example 3

A changing flow calibration factor can also be detected and corrected by utilizing a multiple degree of freedom model. In a multiple degree of freedom model, a change in the flow calibration factor is a function of model parameters (i.e. mass, stiffness, mode shape, complex pole, etc.), fluid properties (density, pressure, etc.) and environmental conditions (temperature, vibration etc).

In order to determine parameters that affect the flow calibration factor, a response model must first be determined. Response models are valuable in that they are direct measurements of the actual structure. The structure's response from a known excitation is usually in the form of an impulse response function (IRF) or frequency response function (FRF). After the response model is determined, the response model is converted into a modal model, and then into a spatial model.

For example, in a modal model, the flow calibration factor is a function of the mode shape and modal frequencies as evidenced by the following expressions:

$$\Delta\%MFCF = f(\rho_{fluid}, K) = C_f \rho_{fluid} + C_K K$$

$$\Delta\%MFCF = g(\phi, \lambda) = C_\phi \phi + C_\lambda \lambda \quad (25)$$

where
$\Delta\%$ MFCF—percent change in mass flow calibration factor
$\rho_{fluid}$—fluid density
K—stiffness of the sensor.
$\phi_r$—mode shapes
$\lambda_r$—complex pole of the sensor's $r^{th}$ mode.

By periodically measuring modal parameters, fluid properties and other environmental parameters, a change in the flow calibration factor can be detected and corrected.

Figure 6:
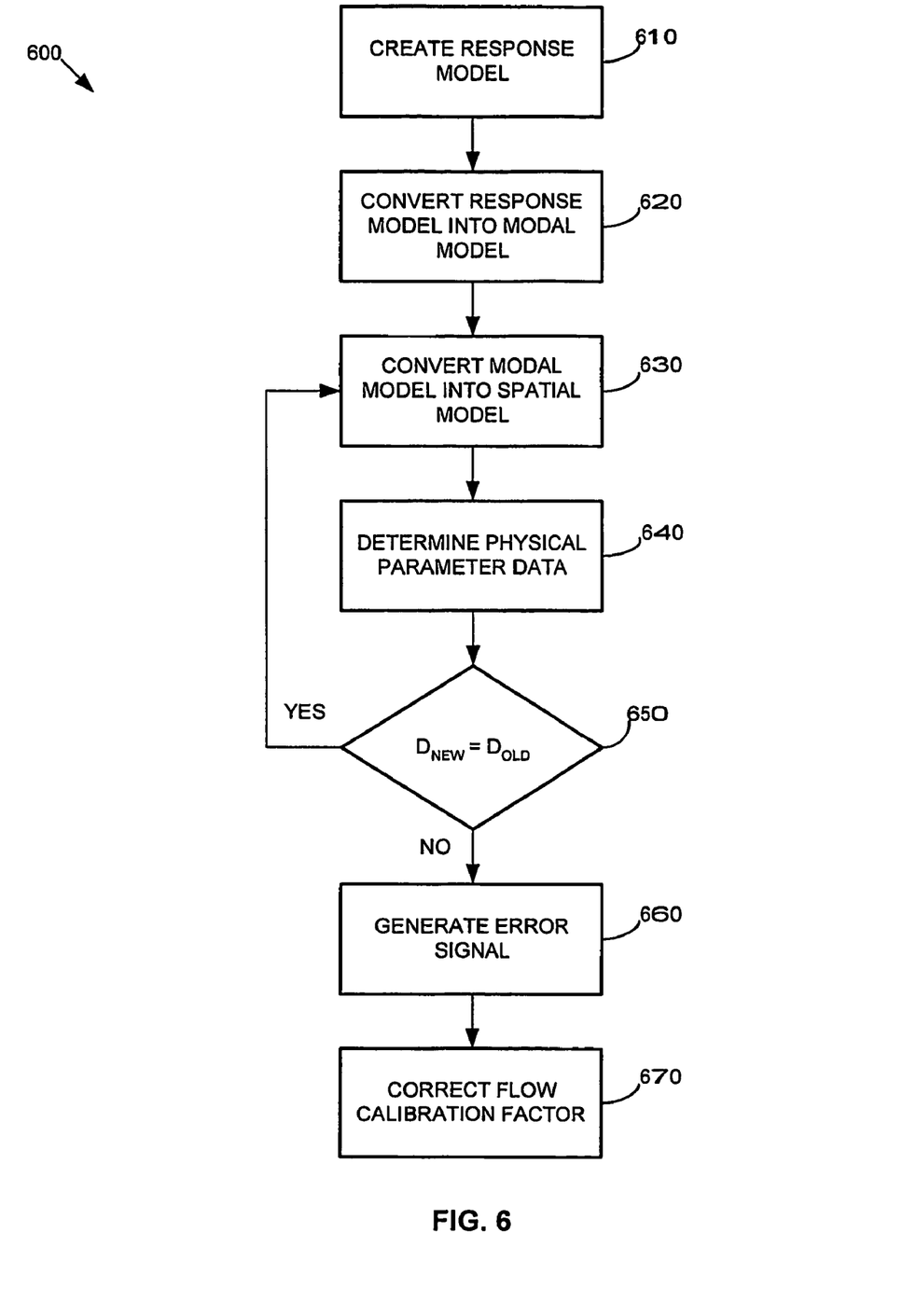
FIG. 6 illustrates a validation system in an example of the invention.

FIG. 6 shows a process 600 for validating the flow calibration factor of a Coriolis meter using a multi-degree of freedom model. Process 600 begins in step 610 by creating a response model of a structure. Step 620 converts the response model from step 610 into a modal model. The modal model is then converted into a spatial model in step 630. In step 640, physical parameters, such as flexural stiffness, can be determined from the spatial model.

Step 650 compares the current physical parameter data with previously determined physical parameter data, to establish if a change has occurred. If no change has occurred, measurement can continue to take place at a predefined interval at the request of a user. If a change has occurred, an error signal is generated in step 660. After the error signal in generated, step 670 corrects the calibration factor. Correction can either be done automatically or only at the request of the user.

Correction of the flow calibration factor can be accomplished using various methods including coefficient estimation, multi-fluid calibration and trending. Coefficient estimation uses equations, like equation 25 above, with an estimation of $C_f$ and $C_K$. For instance, if the material properties of a meter are affected by temperature, values for $C_f$ and $C_K$ can be estimated by finite element analysis and determination of a nominal material property change with temperature.

Multi-fluid calibration involves the calibration of a meter using at least two fluids at two different stiffnesses. Coefficients $C_f$ and $C_K$ can be determined by using the following least squares fit:

$$\begin{Bmatrix} MFCF_1 \\ M \\ MFCF_N \end{Bmatrix} = \begin{bmatrix} \rho_{fluid_1} & K_1 \\ M & M \\ \rho_{fluid_N} & K_N \end{bmatrix} \begin{Bmatrix} C_f \\ C_k \end{Bmatrix} \quad (26)$$

$$\begin{Bmatrix} C_f \\ C_k \end{Bmatrix} = \begin{bmatrix} \rho_{fluid_1} & K_1 \\ M & M \\ \rho_{fluid_N} & K_N \end{bmatrix}^+ \begin{Bmatrix} MFCF_1 \\ M \\ MFCF_N \end{Bmatrix}$$

Trending techniques can also be used to correct the flow calibration factor. Initial model parameters, fluid properties, and temperature data is collected in the transmitter and the coefficients for a polynomial, n-dimensional "operating surface" $f(\rho_{fluid}, K, T, \sigma, P, \ldots)$ would be determined. Because there is generally a linear relationship between flow calibration factor, fluid properties, model parameters, and temperature, a change would be identified when newer data showed coefficients changing with respect to the initial coefficients.

As an example, assume the fluid density has no effect on flow calibration factor, or $C_f$ is zero. The measured stiffness will change with temperature due to changes in the flow tube's material properties. Furthermore the measured stiffness will change due to temperature affecting a transducer's material properties and sensitivity. Therefore the rate of change of stiffness due to temperature is unknown. Nevertheless, the stiffness and temperature can be measured at a specific time, i.e. time of installation. The data can be used to establish the relationship between stiffness and temperature. Most material properties change linearly with temperature over a wide range as shown by:

$$K(T) = f(T) = C_K C_{trans1} \Delta T + C_{trans2} \quad (27)$$

where
$C_K$=rate of change of stiffness due to temperature,
$C_{trans1}$=rate of change of the transducer's sensitivity change, and
$C_{trans2}$=transducer's offset Initial data taken at the time of installation or at the factory over a range of flow tube temperatures allows you to calculate $C_K$, $C_{trans1}$ and $C_{trans2}$.

The stiffness measured at any temperature will fall in a trend line. When enough stiffness measurements are made over a reasonable temperature range, the slope, or the rate of change of the stiffness with respect to temperature can be estimated using a least squares fit. This is the common change of the stiffness with respect to temperature. When the stiffness and temperature are measured and the data point does not fall on the curve, then a change in the sensor has occurred and the MFCF has also changed.

The fact that the stiffness estimate is changing with temperature indicates that the flow tube material and transducer material properties are in slight error. A correction can be made in the temperature correction coefficients to make the measured stiffness vs. temperature slope zero. The correction may be made by an optimization process to minimize the error. Subsequent to this correction, a stiffness change will indicate the change in the MFCF.

The concept of a multiple degree of freedom model can be applied to other parameters, including flow calibration factor changes due to fluid density, pressure, external vibration, etc.

Normalization

The described solutions to a multiple-degree of freedom model are ideal when the structure does not change over time. However, in some applications a structure changes over time. In the case of a flow sensor, the density of a process fluid conveyed by the sensor may change over time resulting in a change in mass of the sensor. Furthermore, ambient temperature and process fluid temperature may change over time, altering the material properties of the sensor. In order to collect meaningful data at varying conditions, a normalization process needs be implemented.

For the case of a flow sensor, there are three main types of normalization. The first is to normalize that data with respect to a resonant frequency. Various process fluid properties, such as fluid density, flow, and pressure, cause the resonant frequency to shift. The second is to normalize that data with respect to a reference temperature. The third is to normalize the data with respect to the displacement, or some other response variable.

For example, a typical Coriolis flow meter operates at a specific resonance for a specific material density. At one fluid density, the resonant frequency is at 152 Hz. If the fluid density increases, the resonant frequency shifts down to 121 Hz. The position of the resonant frequency relative to the test frequencies causes significant errors in the estimates of the model parameters. Therefore, the data needs to be normalized in order to produce meaningful results.

Figure 7:
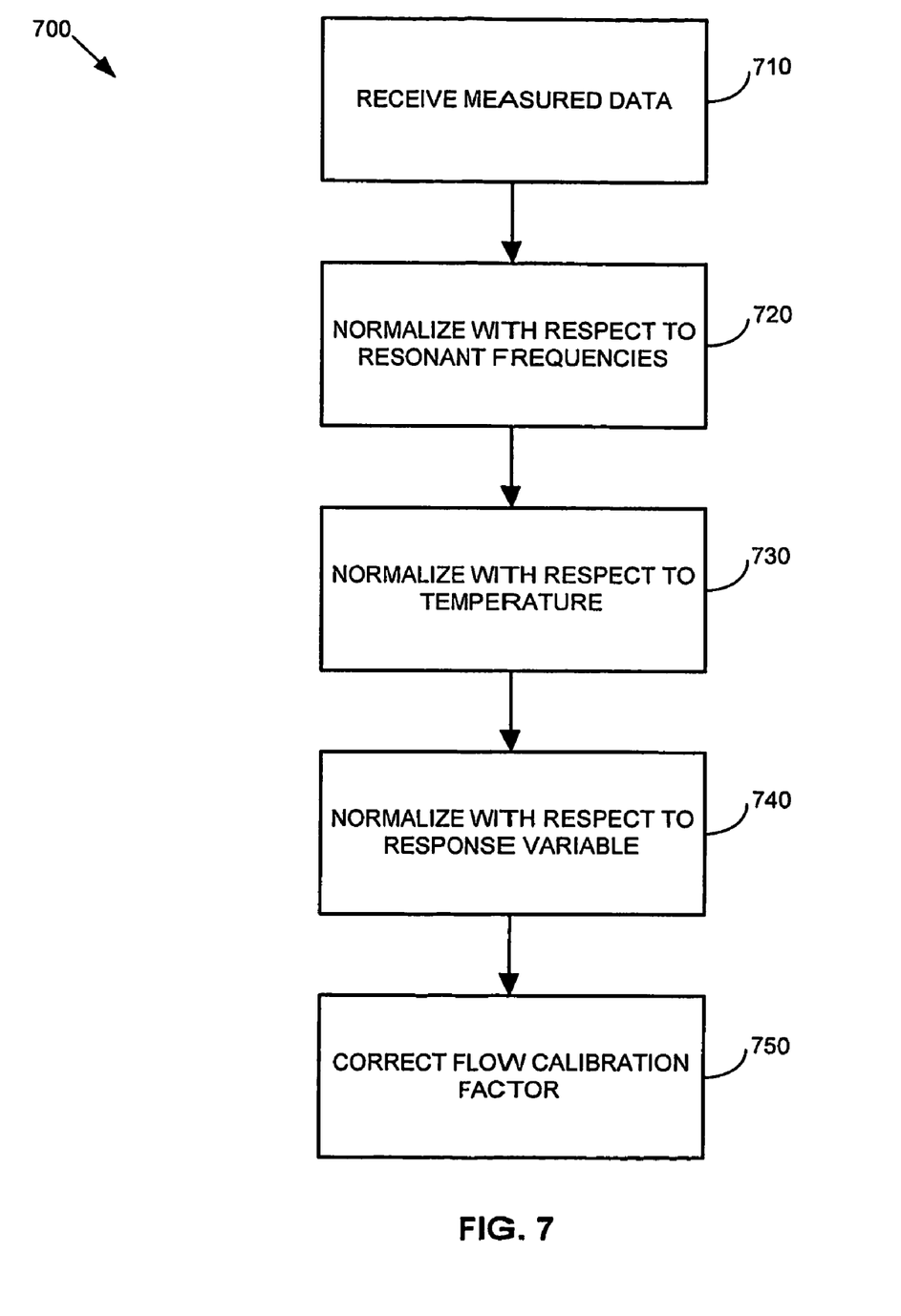
FIG. 7 illustrates a validation system in an example of the invention.

FIG. 7 shows a process 700 for normalizing data in order to correct the flow calibration factor of a Coriolis meter using a multi-degree of freedom model. Process 700 begins in step 710 by receiving data from the structure. Once the data is received it is normalized with respect to the resonant frequency. This allows the model parameters to be calculated from data measured for any fluid density. Tracking the resonant frequency allows the test frequency to be set as a scalar of the resonant frequency.

Next in step 730, we normalize the data with respect to a reference temperature. This corrects errors resulting from data that is measured at two different temperatures. For example, two important material properties change with temperature causing a discrepancy in the measured data. The modulus of elasticity of the tube material changes by approximately −4.2%/100° C. Since most Coriolis flow meters use voice coil transducer to measure flow and drive, changes in temperature will change the strength of the magnetic field and change the length of the wire in the coil. For a typical AlNiCo magnet, the magnetic flux density changes by −2.1%/100° C. for both the driver and pickoff.

Also, a Coriolis flow meter's modulus will change with temperature. Coriolis flow meters typically utilize a temperature sensor in order to report the temperature of the fluid in the sensor. Using this temperature measurement, the FRF measurements can be corrected back to some reference temperature.

In step 740, the data is normalized with respect to displacement or some other a response variable. This is done by integrating from mobility (velocity/force) to receptance (displacement/force). The following is an example of the equation used to normalize the measured data:

$$H_{normalized}(\omega_{test\_freq}, T_{ref}) = \frac{\dot{H}(\omega_{test\_freq}, T)}{[1 + C_{drive\_mag}(T - T_{ref})]} \frac{[1 = C_g(T - T_{ref})]}{[1 + C_{pickoff\_mag}(T - T_{ref})]} (j\omega_{test\_freq}) \quad (28)$$

Once the data has been normalized, step 750 corrects the flow calibration factor using the methods described herein.

What is claimed is:

1. A method for validating a flow calibration factor of a flow meter, comprising the steps of:
    determining an initial flexural stiffness of a component of said flow meter;
    determining a current flexural stiffness of said component from a flow meter vibrational displacement produced in response to application of a predetermined force to one or more flow tubes of the flow meter;
    comparing said initial flexural stiffness to said current flexural stiffness; and
    detecting a calibration error condition responsive to comparing said initial flexural stiffness to said current flexural stiffness.

2. The method of claim 1 further comprising the step of signaling said calibration error condition.

3. The method of claim 1 or 2 further comprising the step of:
    correcting said flow calibration factor responsive to said calibration error condition being detected.

4. The method of claim 1 wherein said current flexural stiffness is determined by solving a single degree of freedom model.

5. The method of claim 4 wherein said single degree of freedom model is solved using a method comprising the steps of:
    applying a known force to said flow meter component;
    measuring a resultant deflection of said flow meter component; and
    determining said current flexural stiffness responsive to said force and resultant deflection,
    wherein the vibrational displacement is the resultant deflection.

6. The method of claim 4 wherein said single degree of freedom model is solved using a method comprising the steps of:
    determining a receptance transfer function;
    calculating an inverse receptance frequency response; and
    determining said current flexural stiffness responsive to said frequency response.

7. The method of claim 4 wherein said single degree of freedom model is solved using a method comprising the steps of:
    applying a transfer function to a complex frequency response;
    converting said transfer function from a mobility form to a response form;
    extracting modal parameters from said transfer function; and
    calculating said current flexural stiffness responsive to said modal parameters.

8. The method of claim 6 or 7 wherein said transfer function is determined using a multi-sine excitation method, comprising the steps of:
    defining a multi-sine excitation signal;
    applying said multi-sine to an input of said flow meter component;
    measuring a resultant output responsive to said multi-sine input; and
    determining said transfer function responsive to said multi-sine input and said resultant output.

9. The method of claim 1 wherein said current flexural stiffness is determined by solving a multiple degree of freedom model.

10. The method of claim 9 wherein said method of solving a multiple degree of freedom model comprises the steps of:
    generating a response model of said flow meter structure;
    converting said response model to a modal model;
    converting said modal model into a spatial model; and
    determining said current flexural stiffness from said spatial model.

11. The method of claim 10 wherein said step of generating a response model further comprising the step of normalizing model data.

12. The method of claim 11 wherein said normalizing step comprises the steps of:
    normalizing said model data with respect to a resonant frequency;

normalizing said model data with respect to a reference temperature; and normalizing said model data with respect to a response variable.

13. The method of claim 12 wherein said response variable is displacement.

14. The method of claim 9 wherein said calibration error is corrected using coefficient estimation techniques.

15. The method of claim 9 wherein said calibration error is corrected using multi-fluid calibration techniques.

16. The method of claim 9 wherein said calibration error is corrected using trending techniques.

17. A system for validating a flow calibration factor of a flow meter comprising:

means for determining an initial flexural stiffness of a component of said flow meter;

means for determining a current flexural stiffness of said component from a flow meter vibrational displacement produced in response to application of a predetermined force to one or more flow tubes of the flow meter;

means for comparing said initial flexural stiffness to said current flexural stiffness; and means for detecting a calibration error condition responsive to comparing said initial flexural stiffness to said current flexural stiffness.

18. The system of claim 17 wherein said system further comprises a means for signaling said calibration error condition.

19. The system of claim 17 or 18 wherein said system further comprises a means for correcting said flow calibration factor error condition.

20. The system of claim 19 wherein said means for correcting said flow calibration error corrects using coefficient estimation techniques.

21. The system of claim 19 wherein said means for correcting said flow calibration error corrects using multi-fluid calibration techniques.

22. The system of claim 19 wherein said means for correcting said flow calibration error corrects using trending techniques.

23. The system of claim 17 wherein said means for determining said current flexural stiffness comprises a means for solving a single degree of freedom model.

24. The system of claim 23 wherein said means for solving said single degree of freedom model comprises:

means for applying a known force to said flow meter component;

means for measuring a resultant deflection of said flow meter component; and means for determining said current flexural stiffness responsive to said force and resultant deflection, wherein the vibrational displacement is the resultant deflection.

25. The system of claim 23 wherein said means for solving said single degree of freedom model comprises:

means for determining a receptance transfer function;

means for calculating an inverse receptance frequency response; and means for determining said current flexural stiffness responsive to said frequency response.

26. The system of claim 23 wherein said means for solving said single degree of freedom model comprises:

means for applying a transfer function to a complex frequency response;

means for converting said transfer function from a mobility form to a response form;

means for extracting modal parameters from said transfer function; and means for calculating said current flexural stiffness responsive to said modal parameters.

27. The system of claim 25 or 26 wherein said transfer function is determined using a multi-sine excitation means, said multi-sine excitation means comprising:

means for defining a multi-sine excitation signal;

means for applying said multi-sine to an input of said flow meter component;

means for measuring a resultant output responsive to said multi-sine input; and means for determining said transfer function responsive to said multi-sine input and said resultant output.

28. The system of claim 17 wherein said means for determining said current flexural stiffness comprises a means for solving a multiple degree of freedom model.

29. The system of claim 28 wherein said means for solving a multiple degree of freedom model comprises:

means for generating a response model of said flow meter structure;

means for converting said response model to a modal model;

means for converting said modal model into a spatial model; and means for determining said current flexural stiffness from said spatial model.

30. The system of claim 29 wherein said means for of generating a response model further comprises a means for normalizing model data.

31. The system of claim 30 wherein means for normalizing model data further comprises:

means for normalizing said model data with respect to a resonant frequency;

means for normalizing said model data with respect to a reference temperature; and means for normalizing said model data with respect to a response variable.

32. The system of claim 31 wherein said response variable is displacement.

33. The system of claim 31 wherein said response variable is acceleration.

* * * * *

UNITED STATES PATENT AND TRADEMARK OFFICE
CERTIFICATE OF CORRECTION

PATENT NO. : 7,904,268 B2
APPLICATION NO. : 10/575983
DATED : March 8, 2011
INVENTOR(S) : Glen Wheeler et al.

It is certified that error appears in the above-identified patent and that said Letters Patent is hereby corrected as shown below:

Column 9, Line 58 through Line 63, replace equation (26) with $$\begin{Bmatrix} MFCF_1 \\ \vdots \\ MFCF_N \end{Bmatrix} = \begin{bmatrix} \rho_{fluid_1} & K_1 \\ \vdots & \vdots \\ \rho_{fluid_N} & K_N \end{bmatrix} \begin{Bmatrix} C_f \\ C_K \end{Bmatrix} \qquad (26)$$

$$\begin{Bmatrix} C_f \\ C_K \end{Bmatrix} = \begin{bmatrix} \rho_{fluid_1} & K_1 \\ \vdots & \vdots \\ \rho_{fluid_N} & K_N \end{bmatrix}^+ \begin{Bmatrix} MFCF_1 \\ \vdots \\ MFCF_N \end{Bmatrix}$$

Column 11, Line 46 through Line 51, replace equation (28) with $$H_{normalized}(\omega_{test\_freq}, T_{ref}) = \frac{[1 = C_E(T - T_{ref})] H(\omega_{test\_freq}, T)}{[1 + C_{drive\_mag}(T - T_{ref})][1 + C_{pickoff\_mag}(T - T_{ref})](j\omega_{test\_freq})}$$

(28)

Signed and Sealed this
Nineteenth Day of July, 2011

David J. Kappos
*Director of the United States Patent and Trademark Office*